(12) United States Patent
Cottet et al.

(10) Patent No.: US 11,753,143 B2
(45) Date of Patent: Sep. 12, 2023

(54) TURBOMACHINE MODULE EQUIPPED WITH A SYSTEM FOR CHANGING THE PITCH OF THE BLADES OF A PROPELLER AND WITH A DEVICE FOR FEATHERING THE BLADES

(71) Applicant: SAFRAN AIRCRAFT ENGINES, Paris (FR)

(72) Inventors: Clement Cottet, Moissy-Cramayel (FR); Thierry Georges Paul Papin, Moissy-Cramayel (FR); Regis Eugene Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/626,655

(22) PCT Filed: Jul. 16, 2020

(86) PCT No.: PCT/FR2020/051291
§ 371 (c)(1),
(2) Date: Jan. 12, 2022

(87) PCT Pub. No.: WO2021/009468
PCT Pub. Date: Jan. 21, 2021

(65) Prior Publication Data
US 2022/0289362 A1    Sep. 15, 2022

(30) Foreign Application Priority Data
Jul. 18, 2019 (FR) ...................................... 1908149

(51) Int. Cl.
*F04D 29/32* (2006.01)
*B64C 11/38* (2006.01)
(Continued)

(52) U.S. Cl.
CPC ............ *B64C 11/385* (2013.01); *B64C 11/06* (2013.01); *F01D 7/02* (2013.01); *F04D 29/323* (2013.01);
(Continued)

(58) Field of Classification Search
None
See application file for complete search history.

(56) References Cited

U.S. PATENT DOCUMENTS

2008/0179455 A1 *  7/2008  Gallet .................. F04D 29/323
                                                       244/65
2011/0236212 A1    9/2011  Gallet
(Continued)

FOREIGN PATENT DOCUMENTS

EP    2000404 A2 * 12/2008  ............. B64C 11/06
EP    2674357 A2 * 12/2013  ............. B64C 11/06
FR    3046432 A1    7/2017

OTHER PUBLICATIONS

International Search Report received for PCT Patent Application No. PCT/FR2020/051291, dated Nov. 16, 2020, 6 pages (2 pages of English Translation and 4 pages of Original Document).

*Primary Examiner* — Michael Lebentritt
(74) *Attorney, Agent, or Firm* — Womble Bond Dickinson (US) LLP

(57) ABSTRACT

The invention relates to a module of a turbomachine of longitudinal axis X, the module comprising: •—a rotary casing (31) that rotates about the longitudinal axis and bears a propeller (2; 20, 21, 22) which is provided with a plurality of blades (32); •—a fixed casing (48) comprising a cylindrical wall (49) extending between an inner wall (40) and an outer wall (41) of the rotary casing (31); and, •—a system (30) for changing the pitch of the blades of the propeller, mounted around the fixed casing and comprising: a control means (55) comprising a movable body (57) that is able to (Continued)

move axially on said fixed casing, at least one load transfer bearing (56) comprising an inner ring (65) that is connected to the movable body (57), and an outer ring (66); and a connection mechanism (61) for connecting the outer ring (66) to the blades of the propeller. According to the invention, the module further comprises a feathering device (70) for feathering the blades of the propeller, this device (70) comprising an annular row of springs (71) that are arranged around said fixed casing and extend axially, the springs (71) comprising first axial ends (72) that bear against a ferrule (51) of the fixed casing, and opposite second axial ends (73) that bear against said inner ring (65).

14 Claims, 3 Drawing Sheets

(51) Int. Cl.
*B64C 11/06* (2006.01)
*F01D 7/02* (2006.01)
*B64D 27/00* (2006.01)

(52) U.S. Cl.
CPC .... *B64D 2027/005* (2013.01); *F05B 2260/74* (2013.01); *F05D 2260/79* (2013.01)

(56) References Cited

U.S. PATENT DOCUMENTS

| | | |
|---|---|---|
| 2018/0043990 A1 | 2/2018 | Tajan et al. |
| 2022/0135207 A1* | 5/2022 | Cottet .................... B64C 11/06 416/154 |

* cited by examiner

TURBOMACHINE MODULE EQUIPPED WITH A SYSTEM FOR CHANGING THE PITCH OF THE BLADES OF A PROPELLER AND WITH A DEVICE FOR FEATHERING THE BLADES

TECHNICAL FIELD OF THE INVENTION

The present invention concerns the field of the turbomachines and in particular a module for changing the pitch of the blades of a turbomachine propeller. It also applies to the corresponding turbomachine.

TECHNICAL BACKGROUND

The search for the best propulsive efficiency by improving the propulsive efficiency of the turbomachine and specifically by reducing their consumption has led to an increase in their bypass ratio. As a result, turboprop engine propellers and turbojet engine fans are appearing on the aeronautical landscape with increasingly larger external diameters. Such choices generate an increase in the operability constraints of the blades of the fan or of the propellers between ground and flight operating conditions, such as a reduction in their speed, their compression ratio, etc.

An effective way to address these constraints has been to consider blades of fan or of a propeller with a variable pitch. The propellers or fans with variable pitch allow the adjustment of the pitch or the orientation of the blades, and more precisely the pitch angle of the blades according to the flight parameters in order to optimize their operation. For this purpose, the turbomachines are equipped with a system for changing the pitch of the blades which comprises a control means comprising a movable body axially mounted around a stationary casing, at least one load transfer bearing connected to the movable body and to a connection mechanism which is connected to the blades. The variable pitch blades can occupy an extreme working position referred to as "reverse" in which they allow to generate counter-thrust so as to participate in the slowing down of the aircraft and an extreme feathering position in which, in the event of failure of the pitch changing system, breakdown or stoppage of the turbomachine, they allow to minimise the aerodynamic drag and limit the rotation of the turbomachine. In the latter configuration, the blades neither absorb nor supply energy. Examples of systems for changing the pitch or feathering of the blades are described in the documents and FR-A1-3046432, US-A1-2011/236212 and US-A1-2018/043990.

A problem arises for the feathering of the blades in the event of breakdown of the turbomachine in particular. It is known that the feathering is operated with the help of a counterweight formed by weights which are attached in an appropriate manner to the pivot of each blade so that their inertia brings back the blade in the feathered position. However, this system is relatively heavy and its integration into the rotor of the fan or of the low hub ratio propeller can be complicated depending on the architecture of the turbomachine.

SUMMARY OF THE INVENTION

The objective of the present invention is to provide a feathering device allowing to reduce the mass of a turbomachine module equipped with a pitch changing system and to facilitate its integration while avoiding major structural modifications.

We achieve this in accordance with the invention by means of a turbomachine module of longitudinal axis X, the module comprising:
- a rotating casing rotatable about the longitudinal axis and carrying a propeller which is provided with a plurality of blades;
- a stationary casing comprising a cylindrical wall extending between an internal wall and an external wall of the rotating casing; and,
- a system for changing the pitch of the blades of the propeller mounted around the stationary casing and comprising:
  - a control means comprising a movable body that is able to move axially on said casing,
  - at least one load transfer bearing comprising an internal ring connected to the movable body and an external ring; and
  - a mechanism for connecting the external ring to the blades of the propeller, the module further comprising a device for feathering the blades of the propeller, this device comprising an annular row of springs arranged around said stationary casing and extending axially, the springs being evenly spaced about the longitudinal axis X and comprising first axial ends bearing on a shell of the stationary casing, and second opposite axial ends bearing on said internal ring.

Thus, this solution allows to achieve the above-mentioned objective. In particular, the springs easily allow the return of the feathering of the blades of the propeller which would force, in case of failure of the control means for example, the latter to position itself in a position corresponding to the feathering position of the blades. These springs are a passive type solution with a zero-breakdown rate and provide the best compromise between the force, the mass and the overall dimension. In addition, the provision of an annular row of springs is an effective arrangement to ensure the optimum feathering return and which is related to the large diameter of the propeller. Finally, the installation of the springs between a shell of the stationary casing and an annulus of the internal ring of the load transfer bearing does not structurally modify the parts of the pitch changing system.

The module also comprises one or more of the following characteristics, taken alone or in combination:
- the springs are compression springs.
- the number of springs is between 6 and 20.
- each spring is housed in a cartridge configured so as to guide the spring on its inner periphery and on its outer periphery.
- the shell is fitted and secured to an axial end of a cylindrical wall of the stationary casing, said control means having its movable body mounted around this cylindrical wall.
- the movable body of the control means is mounted radially outside an annular wall of a stationary body of the control means.
- the movable body of the control means is mounted radially outside the annular wall of the stationary body of the control means.
- each spring is housed in a cartridge configured so as to guide the spring on its inner periphery and on its outer periphery.
- the shell comprises an annular row of ears extending substantially radially with respect to said longitudinal axis, each ear defining a housing for receiving a first spring end.

the second ends bear on an annulus attached to said internal ring.

said annulus comprises barrels for receiving second ends of the springs.

the springs have their axes located on a circumference whose diameter is substantially similar to the diameter of said internal ring.

each cartridge is formed of an ear and of a reception barrel.

the internal ring of the load transfer bearing is mounted on an internal shell annular about the longitudinal axis X and is connected to the movable body via the annulus coaxial to the longitudinal axis X.

the springs have an axial dimension greater than that of said at least one load transfer bearing and are configured to have an expansion or compression stroke adapted to ensure the displacement of each blade from an extreme working position to an extreme feathering position.

The invention further relates to an aircraft turbomachine comprising at least one module as aforesaid. The turbomachine may be a turboprop engine or a turbojet engine.

BRIEF DESCRIPTION OF FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

The invention applies to the turbomachines comprising a propeller or fan with variable pitch blades. Such turbomachines may be a turbojet engine as shown in FIG. 1 or a turboprop engine as shown in FIG. 2.

Figure 1:
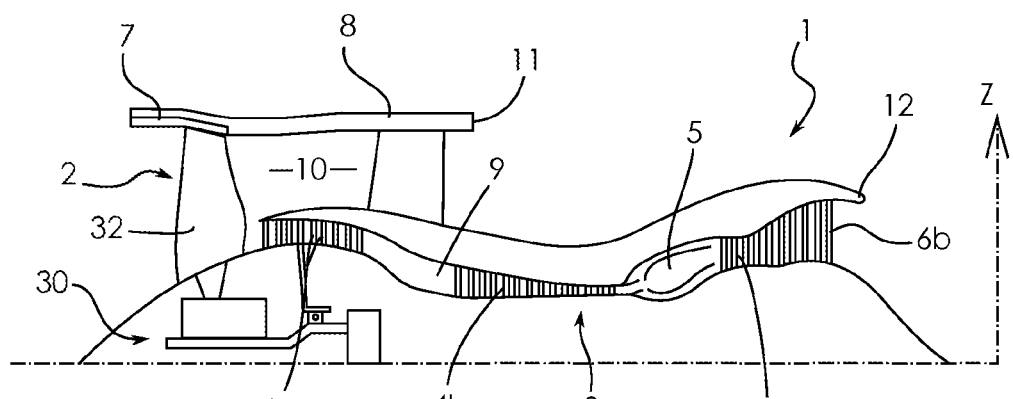
FIG. 1 is a partial axial sectional view of an example of a turbomachine to which the invention applies.
Figure 2:
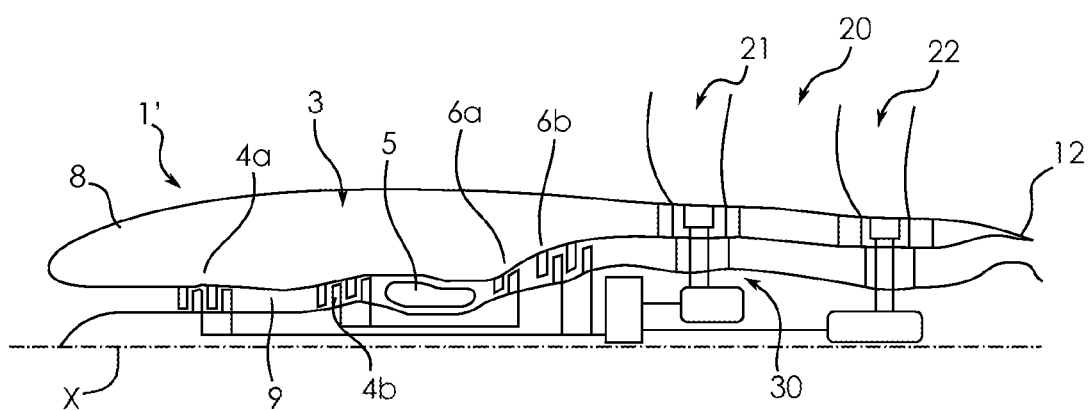
FIG. 2 shows another example of a turbomachine to which the invention applies in axial and partial section.

In the present invention, and in general, the terms "upstream" and "downstream" are defined with respect to the flow of the gases in the turbomachine and here along the longitudinal axis X (and even from left to right in FIG. 1). The terms "axial" and "axially" are also defined with respect to the longitudinal axis X. Similarly, the terms "radial", "internal" and "external" are defined with respect to a radial axis Z perpendicular to the longitudinal axis X and with respect to the distance from the longitudinal axis X.

In FIG. 1, the turbomachine, of longitudinal axis X, in axial and partial section, is of the double flow and double body type and is intended to be mounted on an aircraft. This double flow turbomachine 1 generally comprises a fan 2 mounted upstream of a gas generator 3.

The gas generator 3 comprises, from upstream to downstream, a low pressure compressor 4a, a high pressure compressor 4b, a combustion chamber 5, a high pressure turbine 6a and a low pressure turbine 6b.

The fan 2, which is surrounded by a fan casing 7, is referred to as shrouded. The fan casing is carried by a nacelle 8 enveloping the turbomachine. The fan divides the air entering the turbomachine into a primary air flow which passes through the gas generator 3 and in particular in a primary duct 9, and into a secondary air flow which circulates around the gas generator in a secondary duct 10. The secondary air flow is ejected by a secondary nozzle 11 terminating the nacelle while the primary air flow is ejected outside the turbomachine via an ejection nozzle 12 located downstream of the gas generator 3.

In FIG. 2, the turbomachine 1' of the turboprop engine type, of longitudinal axis X, comprises a doublet of non-shrouded propellers and is intended to be mounted on an aircraft. The same or substantially the same elements described above are represented by the same numerical references. This turbomachine is known as an "open rotor" or "unducted fan". The turboprop engines are thus distinguished from the turbojet engines by the use of at least one propeller outside the nacelle (unshrouded) instead of an internal fan (shrouded).

The turbomachine 1' comprises a nacelle 8 or casing in which is arranged a gas generator 3 which comprises, from upstream to downstream, a low pressure compressor 4a, a high pressure compressor 4b, a combustion chamber 5, a high pressure turbine 6a and a low pressure turbine 6b. The gas generator may comprise a low pressure compressor, a combustion chamber, a low pressure turbine linked to the compressor and a free turbine.

The propeller doublet 20 comprises an upstream propeller 21 and a downstream propeller 22 which are counter-rotating. The upstream 21 and downstream 22 propellers are mounted coaxially to the longitudinal axis X of the turbomachine and are arranged in radial parallel planes, which are perpendicular to the longitudinal axis X. In the present example, the propellers 21, 22 are mounted downstream of the gas generator. A portion of the air flow entering the turbomachine passes through the gas generator into a primary duct 9 and is then ejected through the nozzle 12 to contribute to the thrust of the turbomachine. The free turbine or the turbines rotatably drive the propellers 21, 22 which compress the air outside the nacelle and provide most of the thrust.

Both the turboprop engine and the turbojet engine comprise a turbomachine module with the blades of a propeller (upstream or downstream) and at least one system 30 for changing the pitch of the blades. In the following, the term "propeller" is used to refer to either a fan or a propeller.

Figure 3:
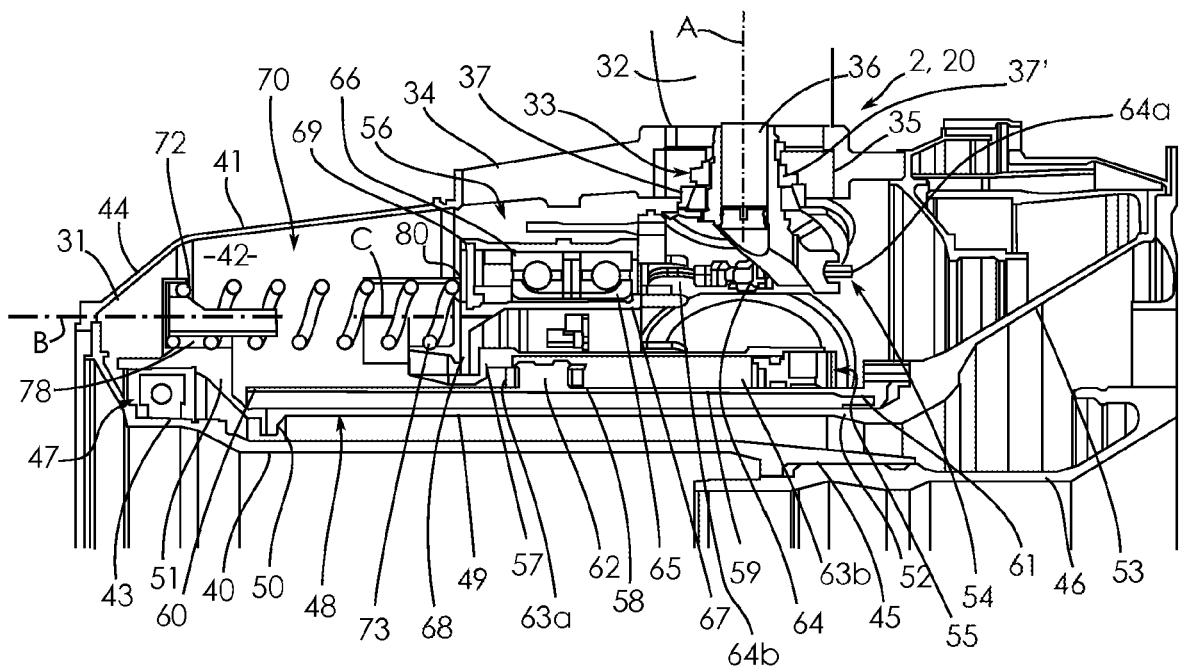
FIG. 3 is a partial axial sectional view of a turbomachine module comprising a pitch changing system and a feathering device cooperating with said pitch changing system according to the invention.

With reference to FIG. 3, the module comprises a rotating casing 31 that is rotatable about the longitudinal axis which carries the propeller 2 provided with a plurality of blades 32. Each blade 32 comprises a root 33 and extends radially outward from the root. The free end of the blades is radially delimited by the fan casing 7 in the case of the turbojet engine. More specifically, the rotating casing comprises a support annulus 34 centred on the longitudinal axis X and which is provided with radial cylindrical housings 35 evenly distributed around the periphery of the support annulus 34. The housings 35 each receive, in a pivoting manner along a pitch axis A, a blade root 33. The pitch axis A is parallel to the radial axis Z.

Typically, each blade root is in the form of a pivot 36 which is mounted in a housing 35 by means of at least one guiding bearing 37. In the present example, two guiding bearings 37, 37' are superimposed along the radial axis Z. These bearings 37 are plain bearings and each comprise an internal ring which is rotationally secured to the pivot and an external ring which surrounds the internal ring. The external ring is supported by the rotating casing 31.

As can be seen in FIG. 3, the rotating casing 31 comprises an internal wall 40 and an external wall 41 which are of revolution. The internal wall and the external wall form an annular volume 42. The external wall 41 supports the support annulus 34 of the blades. The internal wall 40 comprises upstream a first wall 43, generally frustoconical in shape, which is attached to a first end 44, generally frustoconical in shape, of the external wall 41. The second end 45 of the internal wall 40 is coupled to a second frustoconical wall 46 as well.

The rotating casing 31 is supported by at least one bearing on a stationary casing 48 secured to a stationary structure of the turbomachine. The stationary casing 48 comprises a cylindrical wall 49 (here with circular cross-section) which extends radially between the internal wall 40 and the external wall 41 of the rotating casing 31. The cylindrical wall 49 comprises, at its upstream axial end 50, a first shell 51 of substantially frustoconical axial section and centred on the axis X. Advantageously, but are not limited, the first shell 51 is fitted and secured to the upstream axial end 50 of the cylindrical wall 49.

The cylindrical wall 49 also comprises at its opposite axial end 52, downstream, a second shell 53 of substantially frustoconical axial section, centred on the axis X and attached to the stationary structure of the turbomachine. The first shell 51 widens or flares from downstream to upstream with respect to the longitudinal axis X while the second shell 53 widens or flares from downstream to upstream.

Here, a roller bearing 47 is interposed upstream between the first shell 51 of the stationary casing 48 and the first wall 43 of the internal wall 40 of the rotating casing 31.

The system 30 for changing the pitch of the blades allows to vary the pitch of the blades about their pitch axes so that they occupy different angular positions depending on the operating conditions of the turbomachine and the phases of flight concerned. Each blade rotates between an extreme working position (reverse position) and an extreme feathering position of the blades. In particular, in the extreme reverse position, the blades of the propeller participate in the braking of the aircraft, in the manner of the usual thrust reversers, and each have a pitch angle of the order of 5° in relation to the plane of rotation of the blades. In the extreme feathering position, the blades are then at best retracted from the direction of travel of the aircraft, for example in the event of breakdown of the turbomachine, thus allowing to limit the drag. In this latter position, the pitch angle of the blades is positive, and is generally around 90° in relation to the plane of rotation of the blades.

In flight phase, the blades rotate between these two extreme positions and may occupy a small pitch position where the speed of the turbomachine is low (e.g. on the ground) and a large pitch position where the speed of the turbomachine is high (e.g. during climb and take-off). The small pitch pitch angle is of the order of 30° in relation to the plane of rotation of the blades, whereas the large pitch pitch angle is of the order of 40° for the take-off phases or of the order of 60° for the climb phases.

The pitch changing system 30 is arranged in the volume 42 formed by the internal wall 40 and the external wall 41 of the rotating casing 31. The pitch changing system 30 comprises a connection mechanism 54 connected to the blades, a control means 55 acting on the connection mechanism 54 and a load transfer bearing 56 kinematically arranged between the connection mechanism 54 and the control means 55.

The control means 55 comprises a movable body 57 that is able to move axially on the stationary casing 48. In particular, the control means 55 comprises a stationary body 58 which is secured to the stationary structure of the turbomachine and the movable body 57 which moves in translation axially with respect to the stationary body 58. The latter is mounted on the stationary casing so as to be stationary in translation and in rotation with respect to the stationary casing 48. The stationary body 58 comprises an annular wall 59 that is coaxial with the longitudinal axis and comprises a first free end 60 and a second end 61 opposite the first free end along the longitudinal axis. This second end 61 is attached to the cylindrical wall 49 of the stationary casing towards its downstream end 52.

The stationary body 58 comprises a radial wall 62 extending from the annular wall 59 outwardly so as to delimit two chambers 63a, 63b of variable volume and axially opposed in the movable body. The movable body is mounted around the cylindrical wall 49 of the stationary casing (and also extends radially outwardly from the annular wall 59 of the stationary body 58).

In the present example, the control means 55 is a hydraulic cylinder comprising the stationary body and the movable body. The control means 55 is connected to a fluid supply source for supplying pressurized oil to the chambers 63a, 63b of the movable body.

The connection mechanism 54 is connected to the blades on the one hand and to the control means 55 via the load transfer bearing 56 on the other hand. The connection mechanism 54 comprises a plurality of connecting rods 64, each having a first end 64a connected to a blade and a second end 64b connected to the load transfer bearing 56.

The load transfer bearing 56 is arranged between the connection mechanism 54 and the movable body 57 of the control means 55 so as to ensure the transmission of the axial forces exerted by the movable body. The load transfer bearing comprises an internal ring 65 and an external ring 66 forming raceways for rolling-elements. Here the bearing 56 is formed by a double-row ball bearing. The internal ring 65 is mounted on an annular internal shell 67 about the longitudinal axis X and is connected to the movable body via an annulus 68 coaxial with the axis X. The annulus 68 comprises a wall which extends radially. The external ring 66 is secured to an annular external shell 69 which is connected to the connection mechanism 54.

Figure 4:
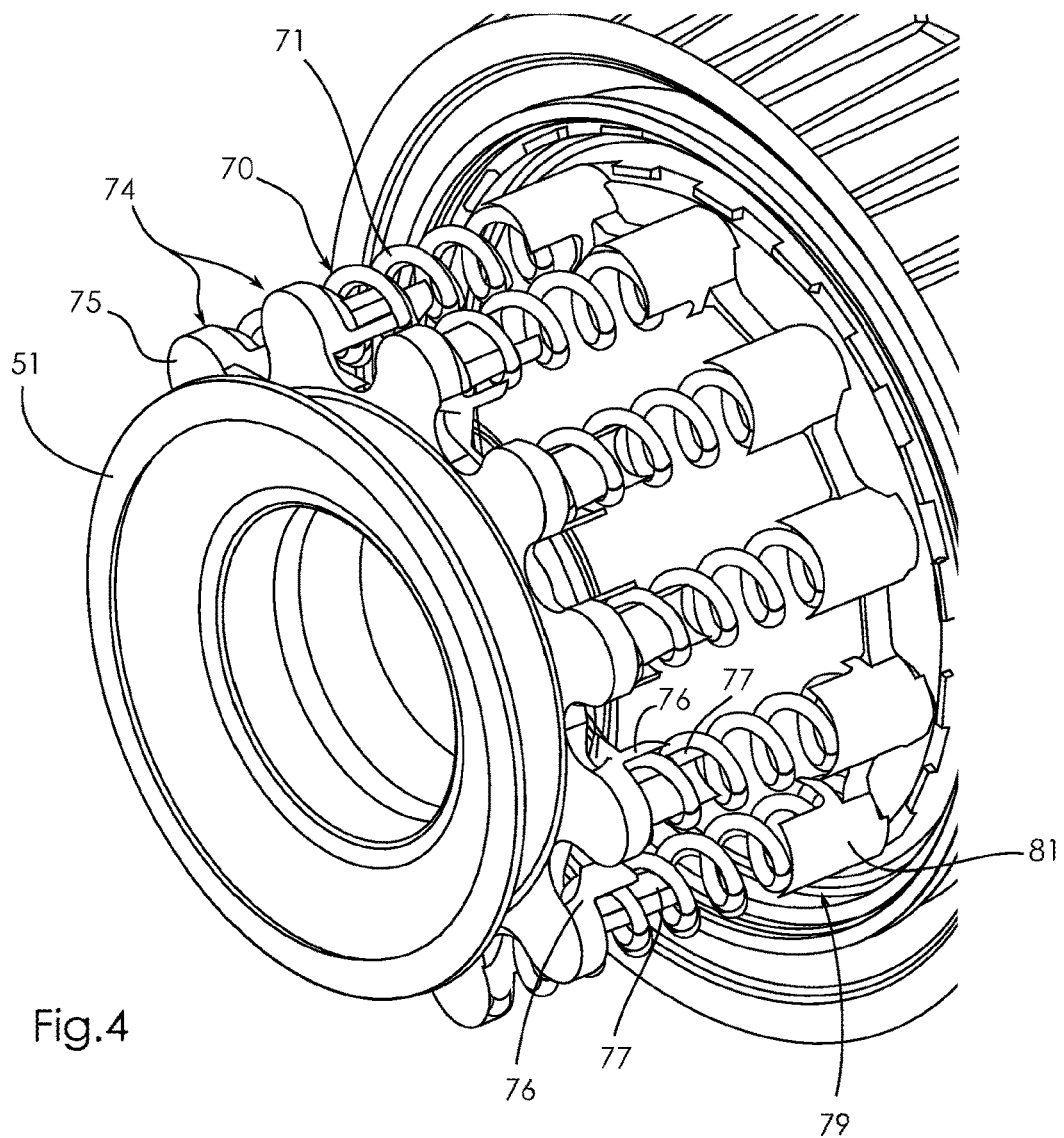
FIG. 4 is a rear perspective view of a pitch changing system and feathering device according to the invention.

With reference to FIGS. 3 and 4, the turbomachine module further comprises a device 70 for feathering the blades of the propeller. This device 70 comprises an annular row of springs 71 arranged around said stationary casing. The springs are evenly spaced around the longitudinal axis. Their number is between 6 and 20. Each spring 71 extends axially between a first axial end 72 and a second axial end 73. As can be seen in these figures, each spring is mounted radially between at least partly the annular wall of the stationary casing 48 and the external wall 41 of the rotating casing 31. Each spring also extends axially between a wall of the stationary casing 48 and the load transfer bearing 56.

The first axial ends 72 of the springs bear on the first shell 51 of the stationary casing and the second axial ends 73 of the springs bear on the internal ring 65 of the load transfer bearing 56.

In this example, the springs 71 are compression springs.

Advantageously, but are not limited, the first shell 51 comprises an annular row of ears 74 extending substantially radially with respect to the longitudinal axis. The ears are evenly distributed around the longitudinal axis. There are as many ears as there are springs. Each ear defines a first spring end reception housing 78. As can be seen in particular in FIGS. 4 and 5, each ear comprises a radial base 75 and a first partition 76 which extends axially from the radial base 75. In this embodiment, the first partition 76 is semi-cylindrical with axis B (see FIG. 3). Each ear 74 also comprises a second partition 77 which extends from the radial base 75, within the first partition and coaxially. The second partition 77 is also semi-cylindrical. The first partition and the second partition are radially superimposed. The second partition 77 has an axial length 12 which is greater than the axial length 11 of the first partition 76. The second partition is equally radially spaced from the first partition and form between them the reception housing 78 of a first spring end.

The annulus 68 attached to the internal ring 65 of the load transfer bearing is coaxial with the longitudinal axis X. The second ends of the springs advantageously bear on this annulus 68. The latter comprises barrels 79 for receiving second ends. In particular, the reception barrels 79 are arranged in an annular row about the longitudinal axis and are evenly distributed. Just like the ears, there are as many reception barrels as there are springs. Each reception barrel comprises a bottom wall 80 and a wall 81 extending axially from the bottom wall. The wall 81 is advantageously, but are not limited, semi-cylindrical of axis C (see FIG. 3). A portion of each spring 71, in particular its second end 73 is housed within the reception barrel 79.

Figure 5:
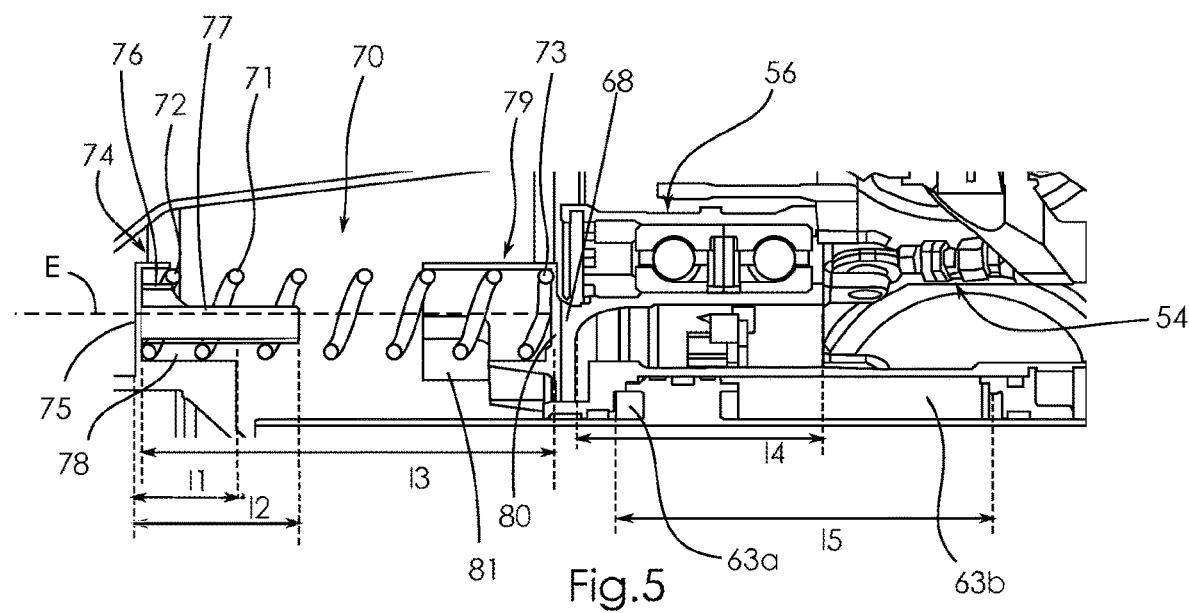
FIG. 5 is a detail view of the feathering device as shown in FIG. 3.
Figure 6:
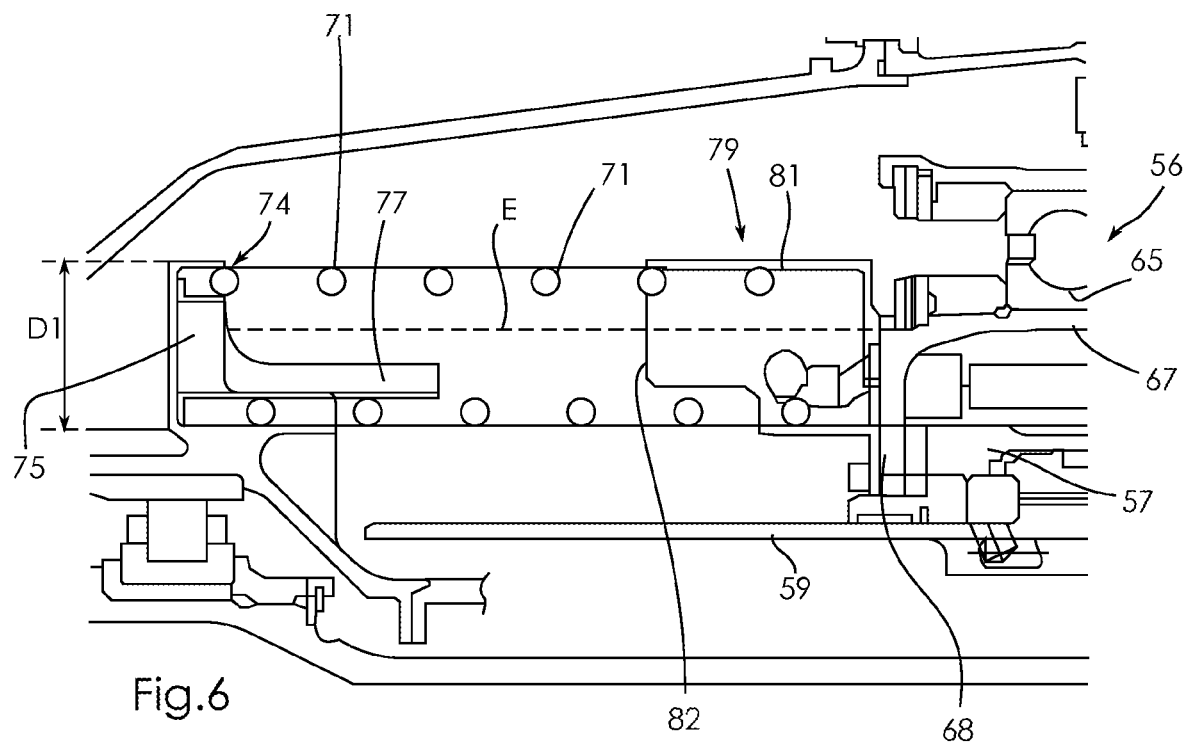
FIG. 6 shows a feathering device in a first position according to the invention.

Each reception barrel 79 is arranged facing an ear 74 axially as can be seen in FIG. 5. With reference to FIG. 6, the diameter of each wall of the reception barrel is substantially equal to the diameter D1 of the first partition of the ears. In this way, the reception barrels and the ears allow to accompany respectively a spring 71 in order to prevent it from coming out of or protruding radially from the cartridge 83 which forms at least partly an ear 74 and a corresponding reception barrel 79.

Each reception barrel 79 guides a spring 71 on the outer periphery thereof while the ear 74 (with its partitions 76, 77) guides the spring from the inside (inner periphery of the spring 71). This limits a minimum segment of the length of the spring that is left "free" and deforms under the centrifugal force effect, when the spring is relaxed.

According to this example embodiment, and as can be seen in detail in FIGS. 5 and 6, the springs 71 have their axes E located on a circumference whose diameter is substantially similar to the diameter of the internal ring of the load transfer bearing. In particular, the circumference corresponds substantially to the internal diameter of the internal ring of the load transfer bearing. We understand that this configuration allows, on the one hand, an application of the forces of the springs advantageously in the axis of the internal ring avoiding transverse forces and, on the other hand, a good compactness radially in the module.

Figure 7:
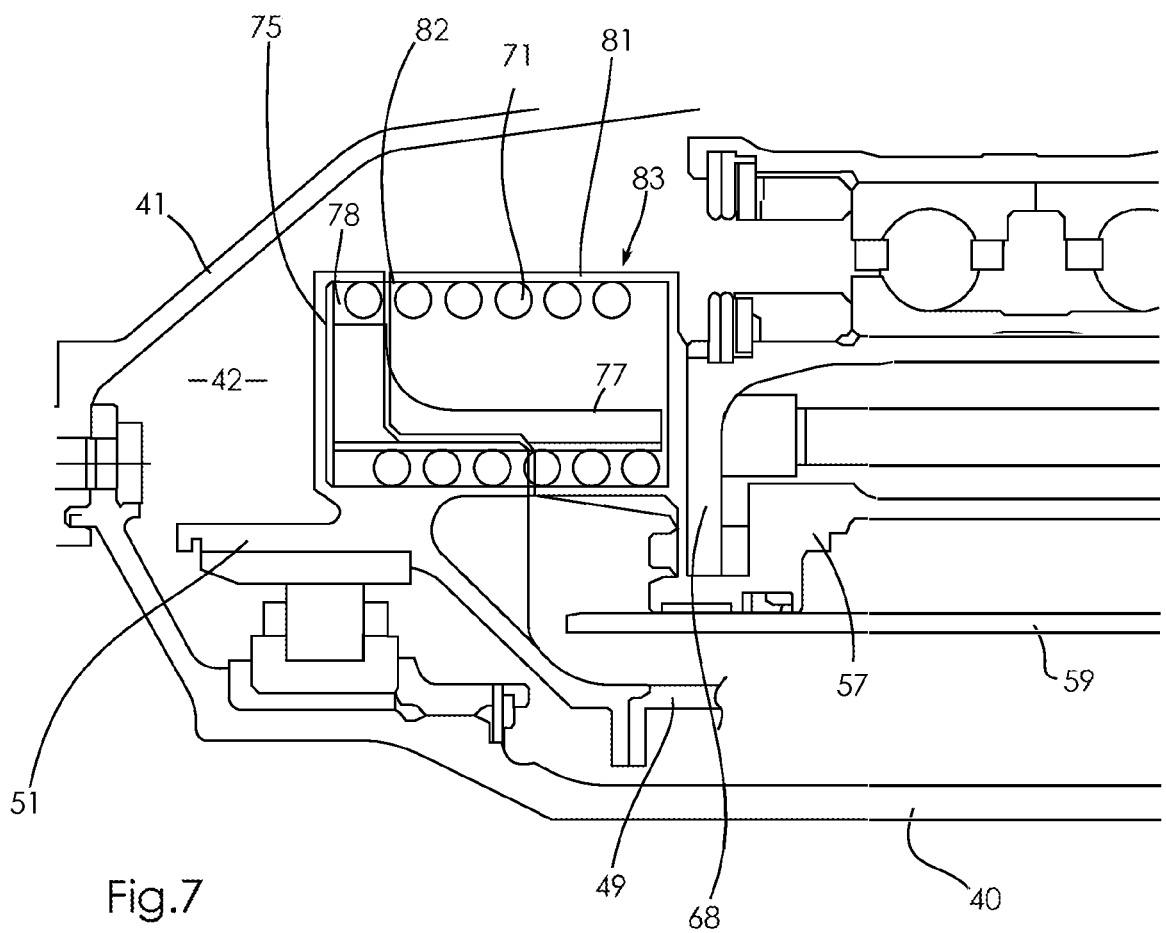
FIG. 7 shows the feathering device in a second position according to the invention.

The springs 71 have an axial dimension 13 greater than that (14) of the load transfer bearing. The axial dimension of the springs 71 is also greater than the axial length 15 of the two chambers 63a, 63b of the movable body. The springs are also configured to have an expansion or compression stroke adapted to ensure the displacement of each blade from an extreme working position to an extreme feathering position. FIGS. 6 and 7 show the extreme working and feathering positions of the blades of the propeller respectively. In the extreme working position (FIG. 7), the movable body of the control means 55 is located upstream of the annular volume 42. The springs 71 are compressed and trapped in the closed cartridge 83 formed by each reception barrel 79 and ear 74. In this position, the wall of the cylindrical barrel comprises a border 82 that comes in abutment against the radial internal wall of the base 75 of the corresponding ear. In the extreme feathering position (FIG. 6), the movable body of the control means 55 is located downstream. Each spring 71 is stretched or relaxed between the ear and the corresponding reception barrel. The border 82 of the wall 81 of the reception barrel is axially spaced from the base 75 of the corresponding ear.

The invention claimed is:

1. A turbomachine module of longitudinal axis X, the module comprising:
   a rotating casing rotatable about the longitudinal axis and carrying a propeller which is provided with a plurality of blades;
   a stationary casing comprising a cylindrical wall extending between an internal wall and an external wall of the rotating casing; and,
   a system for changing the pitch of the blades of the propeller mounted around the stationary casing and comprising:
   a control means comprising a movable body that is able to move axially on said stationary casing,
   at least one load transfer bearing comprising an internal ring connected to the movable body and an external ring; and
   a mechanism for connecting the external ring to the blades of the propeller,
   the module further comprising a device for feathering the blades of the propeller, the module being characterised in that this device comprises an annular row of springs arranged around said stationary casing and extending axially, the springs being evenly spaced about the longitudinal axis X and comprising first axial ends bearing on a shell of the stationary casing, and second opposite axial ends bearing on said internal ring.

2. The module according to claim 1, wherein the springs are compression springs.

3. The module according to claim 1, wherein the number of springs is between 6 and 20.

4. The module according to claim 1, wherein the shell is fitted and secured to an axial end of a cylindrical wall of the stationary casing, said control means having its movable body mounted around this cylindrical wall.

5. The module according to claim 1, wherein the movable body of the control means is mounted radially outside an annular wall of a stationary body of the control means.

6. The module according to claim 1, wherein each spring is housed in a cartridge configured so as to guide the spring on its inner periphery and on its outer periphery.

7. The module according to claim 1, wherein the shell comprises an annular row of ears extending substantially radially with respect to said longitudinal axis, each ear defining a housing for receiving a first spring end.

8. The module according to claim 1, wherein the second ends bear on an annulus attached to said internal ring.

9. The module according to claim 1, wherein said annulus comprises barrels for receiving second ends of the springs.

10. The module according to claim 1, wherein each cartridge is formed of an ear and of a reception barrel.

11. The module according to claim 1, wherein the internal ring of the load transfer bearing is mounted on an internal shell annular around the longitudinal axis X and is connected to the movable body via the annulus coaxial to the longitudinal axis X.

12. The module according to claim 1, wherein the springs have their axes located on a circumference whose diameter is similar to the diameter of said internal ring.

13. The module according to claim 1, wherein the springs have an axial dimension greater than that of said at least one load transfer bearing and are configured to have an expansion or compression stroke adapted to ensure the displacement of each blade from an extreme working position to an extreme feathering position.

14. An aircraft turbomachine comprising at least one module according to claim 1.

* * * * *